United States Patent [19]

Gelles

[11] Patent Number: 5,130,354

[45] Date of Patent: Jul. 14, 1992

[54] ASPHALT-DIENE POLYMER COMPOSITION WITH IMPROVED ADHESION TO POLAR MATERIALS

[75] Inventor: Richard Gelles, Houston, Tex.

[73] Assignee: Shell Oil Company, Houston, Tex.

[21] Appl. No.: 699,022

[22] Filed: May 13, 1991

[51] Int. Cl.$^5$ .................................................. C08L 95/00
[52] U.S. Cl. ....................................... 524/68; 525/342
[58] Field of Search ................ 524/68, 69; 525/342

[56] References Cited

U.S. PATENT DOCUMENTS

| | | | |
|---|---|---|---|
| 3,611,888 | 12/1969 | Kavalir et al. | 94/18 |
| 3,810,707 | 5/1974 | Tungseth et al. | 404/67 |
| 4,011,184 | 3/1977 | van Reijendam et al. | 260/28.5 |
| 4,086,171 | 4/1978 | Wood et al. | 252/33 |
| 4,172,061 | 10/1979 | Bresson | 260/28.5 |
| 4,250,067 | 2/1981 | Bresson | 260/28.5 |
| 4,330,449 | 5/1982 | Maldonado et al. | 524/68 |
| 4,576,648 | 3/1986 | Demangeon et al. | 106/206 |
| 4,578,429 | 3/1986 | Gergen et al. | 525/291 |
| 4,629,754 | 12/1986 | Syrier et al. | 524/394 |
| 4,783,504 | 11/1988 | St. Clair et al. | 525/72 |
| 4,822,857 | 4/1989 | Gorman et al. | 525/245 |
| 4,868,245 | 9/1989 | Pottick et al. | 525/98 |
| 4,882,373 | 11/1989 | Moran | 524/68 |
| 4,882,384 | 11/1989 | Willis et al. | 525/105 |
| 4,994,508 | 2/1991 | Shiraki et al. | 524/68 |

FOREIGN PATENT DOCUMENTS

| | | | |
|---|---|---|---|
| 0216679 | 4/1987 | European Pat. Off. | |
| 0234615 | 9/1987 | European Pat. Off. | |
| 0333936 | 3/1988 | European Pat. Off. | |
| 0299499 | 7/1988 | European Pat. Off. | |
| 0360656 | 3/1990 | European Pat. Off. | |
| 2554944 | 6/1977 | Fed. Rep. of Germany | |
| 0085620 | 7/1975 | Japan | 524/68 |
| 0059868 | 5/1981 | Japan | 524/68 |
| 56-115354 | 9/1981 | Japan | |
| 0047356 | 3/1982 | Japan | 524/68 |
| 58-40349 | 3/1983 | Japan | |
| 0040349 | 3/1983 | Japan | 524/68 |
| 61-258743 | 11/1986 | Japan | |
| 62-61615 | 12/1987 | Japan | |
| 89/10378 | 4/1989 | PCT Int'l Appl. | |
| 1422123 | 9/1972 | United Kingdom | |

Primary Examiner—Paul R. Michl
Assistant Examiner—Peter Szekely
Attorney, Agent, or Firm—Donald F. Haas

[57] ABSTRACT

A bituminous composition comprising a bituminous component and a silane functionalized polymer or an acid functionalized polymer of a conjugated diolefin.

12 Claims, No Drawings

ASPHALT-DIENE POLYMER COMPOSITION WITH IMPROVED ADHESION TO POLAR MATERIALS

BACKGROUND OF THE INVENTION

Asphalt is a common material utilized for the preparation of paving and roofing materials. While the material is suitable in many respects, it inherently is deficient in some physical properties which it would be highly desirable to improve. Efforts have been made in this direction by addition of certain conjugated diene rubbers, ethylene containing plastics like EVA and polyethylene, neoprene, resins, fillers and other materials for the modification of one or more of the physical properties of the asphalt binder. Each of these added materials modifies the asphalt in one respect or another but certain deficiencies can be noted in all modifiers proposed. For example, some of them have excellent weather resistance, sealing and bonding properties but are often deficient with respect to warm tack, modulus, hardness and other physical properties; and some of them improve only the high temperature performance of asphalt, some only improve the low temperature performance of asphalt, while some lack thermal stability or mixing stability with asphalt.

Since the late 1960s, diene polymer rubbers such as styrenebutadiene rubber and styrene-rubber block copolymers such as styrene-butadiene-styrene and styrene-isoprene-styrene block copolymers have been used to dramatically improve the thermal and mechanical properties of asphalts. Practical application of the rubber addition approach requires that the blended product retain improved properties and homogeneity during transportation, storage and processing. Long term performance of elastomermodified asphalts also depends on the ability of the blend to maintain thermal and chemical stability.

To be suitable for paving materials, the asphalt polymer mixtures should meet the following requirements:

(a) The polymer must be mixable in asphalt and stay mixed during subsequent processing.

(b) The mixture must have the right rheological (flow) properties to prevent rutting which is the permanent deformation of a road caused by repetitive traffic loads. Viscosity is important but elasticity is the most important aspect since the material must be able to recover rather than just resist deformation. This characteristic is most important in warm climates.

(c) The mixture must have good low temperature properties, i.e. resistance to cracking. As a road cools, stresses develop because it cannot shrink uniformly and eventually this will cause cracking. Traffic-caused stresses also contribute. The polymer will lower the temperature at which cracking will occur. This characteristic is more important in cold climates.

These polymers are necessary to obtain improved bituminous compositions, specifically for paving, and specifically for hot mix asphalt concrete (HMAC) and joint sealants which are used to fill in cracks in existing pavements. The polymer is added to the bitumens for hot mix asphalt concrete to improve its resistance to deformation caused by traffic loading especially at warm times of the year (rutting resistance), as well as improved resistance to cracking caused by both traffic and thermally induced loads, especially at cold times of the year. It is also necessary that the polymer be easy to mix with the bitumen and that the two do not demix during storage or processing. The polymers must be oxidatively stable during processing and during long term aging on the road.

Temperature susceptibility of a polymer modified asphalt is a major consideration. Ideally, one would want a binder (asphalt and polymer) which would be "hard" and elastic at elevated temperatures to resist permanent deformation and "soft" and strong at low temperatures to resist cracking. In other words, the ideal system should not only exhibit enhanced resistance to deformation but also should resist cracking.

To be suitable for synthetic roofing materials, the asphalt polymer mixtures should meet the following requirements:

(a) sufficient resistance to flow at high temperatures,
(b) sufficient flexibility at low temperatures,
(c) workability according to the conventional methods used in the roofing technique,
(d) adequate hot storage stability,
(e) adequate hardness to prevent deformation during walking on the roof, and
(f) if it is to be used as an adhesive, sufficient adhesion.

For roll roofing applications, it is preferred that the softening point (the temperature at which the material will tend to flow) be above about 250° F., the cold bend temperature, which is not as critical a parameter as the others in this application, (the temperature at which the material will crack during application and service) should be below about $-5°$ C. and that the asphalt and block copolymer components should be able to be mixed at a temperature no higher than about 200° C. to keep the asphalt heating costs down and to prevent softening of the polyester reinforcement commonly used in these membranes.

For roll roofing membranes, the bituminous composition is used to saturate and coat a reinforcing mat. The bitumen is there to make the membrane waterproof. The mat is used to aid in mechanical properties (gives the membrane strength, etc.). Polymer is added to the asphalt to improve the weatherability and mechanical properties of the asphalt.

At the present time, unfunctionalized polymers are being used in paving and roofing applications. Unfunctionalized polymers have certain disadvantages which can cause problems when used in applications such as these. Such disadvantages include undesirably low adhesion to polar materials such as some asphalts, fillers, aggregates, substrates, reinforcing mats, and the like. There is a need for modifiers which have better adhesion to polar materials.

SUMMARY OF THE INVENTION

This invention relates to a bituminous composition with improved adhesion to polar materials. The bituminous composition comprises a bituminous component and a silane functionalized polymer of a conjugated diolefin or an acid functionalized polymer of a conjugated diolefin. Specific applications of this composition include a joint sealant composition which comprises from about 1% to about 15% of a functionalized polymer of a conjugated diolefin and a bituminous component. Another application is a hot melt asphalt concrete composition comprising from about 80 to about 99 parts aggregate and from about 1 to about 20 parts of a bituminous composition which comprises from about 85 to about 99.99 parts of a bituminous component and from about 0.01 to about 15 parts of a functionalized polymer of a conjugated diene.

The silane functionalized polymers are preferred and, within that group, silane functionalized block copolymers of a vinyl aromatic hydrocarbon and a conjugated diene are preferred. A most highly preferred hot melt asphalt concrete composition comprises from about 0.05 parts to about 1 part of a silane functionalized block copolymer of a vinyl aromatic hydrocarbon and a conjugated diene and also includes from about 0.001 to about 5 parts per 100 parts of polymer of a silanol condensation catalyst. This most highly preferred HMAC composition exhibits very good anti-stripping characteristics.

DETAILED DESCRIPTION OF THE INVENTION

The bituminous component in the bituminous-polymer compositions according to the present invention may be a naturally occurring bitumen or derived from a mineral oil. Also, petroleum derivatives obtained by a cracking process, pitch and coal tar can be used as the bituminous component as well as blends of various bituminous materials.

Examples of suitable components include distillation or "straightrun bitumens", precipitation bitumens, e.g. propane bitumens, blown bitumens and mixtures thereof. Other suitable bituminous components include mixtures of one or more of these bitumens with extenders such as petroleum extracts, e.g. aromatic extracts, distillates or residues, or with oils.

The polymers which may be used according to the present invention are polymers of conjugated dienes. Homopolymers of conjugated dienes and copolymers containing two or more conjugated dienes are useful herein. Copolymers of conjugated dienes with vinyl aromatic monomers are preferred and both random and block copolymers thereof are useful herein. The description which follows is described in terms of block copolymers of conjugated dienes and vinyl aromatic hydrocarbons but it is applicable also to the other polymers described in this paragraph. This means that this invention encompasses functionalized polymers which are not block copolymers but which incorporate the functionality described below and functionalized polymers wherein the functionality is in either the conjugated diene or vinyl aromatic hydrocarbon sections of the polymer.

The most preferred base polymers of the present invention are block copolymers of conjugated dienes and vinyl aromatic hydrocarbons. Such block copolymers may be multiblock copolymers of varying structures containing various ratios of conjugated dienes to vinyl aromatic hydrocarbons including those containing up to about 50% by weight of vinyl aromatic hydrocarbon. Thus, multiblock copolymers may be utilized which are linear or radial, symmetric or asymmetric, and which have structures represented by the formulae, A-B, A-B-A, A-B-A-B, B-A, B-A-B, B-A-B-A, (A-B)$_{0,1,2,...}$ B-A and the like wherein A is a polymer block of a vinyl aromatic hydrocarbon and B is a polymer block of a conjugated diene. It is not necessary but B can be a polymer block of a conjugated diene that has been hydrogenated.

The block copolymers may be produced by any well known block polymerization or copolymerization procedures including the well-known sequential addition of monomer techniques, incremental addition of monomer technique or coupling technique as illustrated in, for example, U.S. Pat. Nos. 3,251,905, 3,390,207, 3,598,887 and 4,219,627 which are herein incorporated by reference. As is well known in the block copolymer art, tapered copolymer blocks can be incorporated in the multiblock copolymer by copolymerizing a mixture of conjugated diene and vinyl aromatic hydrocarbon monomers utilizing the difference in their copolymerization reactivity rates. Various patents describe the appropriation of multiblock copolymers containing tapered copolymer blocks including U.S. Pat. Nos. 3,251,905, 3,265,765, 3,639,521 and 4,208,356 which are herein incorporated by reference.

Conjugated dienes which may be utilized to prepare the polymers and copolymers include those having from 4 to 8 carbon atoms and also include 1,3-butadiene, 2-methyl-1,3-butadiene(isoprene), 2,3-dimethyl-1, 3-butadiene, 1,3-pentadiene, 1,3-hexadiene and the like. Mixtures of such conjugated dienes may also be used. The preferred conjugated dienes are 1,3-butadiene and isoprene.

Vinyl aromatic hydrocarbons which may be utilized to prepare copolymers include styrene, o-methylstyrene, p-methylstyrene, p-tert-butylstyrene, 2,4-dimethylstyrene, alpha-methylstyrene, vinylnaphthalene, vinylanthracene and the like. The preferred vinyl aromatic hydrocarbon is styrene.

The present invention works with both unhydrogenated and hydrogenated polymers. Hydrogenated ones are useful in certain circumstances. While unhydrogenated diene polymers have a number of outstanding technical advantages, one of their principal limitations lies in their sensitivity to oxidation. This can be minimized by hydrogenating the copolymers, especially in the diene blocks. The hydrogenation of these polymers and copolymers may be carried out by a variety of well established processes including hydrogenation in the presence of such catalysts as Raney Nickel, noble metals such as platinum, palladium and the like and soluble transition metal catalysts. Titanium biscyclopentadienyl catalysts may also be used. Suitable hydrogenation processes which can be used are ones wherein the diene-containing polymer or copolymer is dissolved in an inert hydrocarbon diluent such as cyclohexane and hydrogenated by reaction with hydrogen in the presence of a soluble hydrogenation catalyst. Such processes are disclosed in U.S. Pat. Nos. 3,113,986, 4,226,952 and Reissue 27,145, the disclosures of which are herein incorporated by reference. The polymers are hydrogenated in such a manner as to produce hydrogenated polymers having a residual unsaturation content in the polydiene block of less than about 20%, and preferably as close to zero percent as possible, of their original unsaturation content prior to hydrogenation.

In general, any materials having the ability to react with the base polymer are operable for purposes of the present invention to make the functionalized polymers used herein. One method to incorporate the functional groups into the base polymer is to graft monomers capable of reacting with the base polymer in solution or in the melt by free radical mechanisms. There are many other possible ways to incorporate functional groups into the polymer. Examples include metalation as described in U.S. Pat. Nos. 4,868,245 and 4,882,384, and sulfonation as described in U.S. Pat. No. 4,086,171, all of which are herein incorporated by reference. The method chosen to incorporate the functional groups in not critical to the invention.

The preferred polymers for use herein are silane functionalized polymers. Such polymers and their method of manufacture are described in U.S. Pat. Nos. 4,783,504 and 4,882,384, which are herein incorporated by reference. The first patent describes silane functionalized polymers wherein the silane functionality is grafted onto the conjugated diene portion of the polymer using free radical techniques. The second patent describes polymers wherein the silane functionality is incorporated into the vinyl aromatic hydrocarbon portion of the polymer using metalation techniques. The metallation process is described in U.S. Pat. No. 4,868,245 discussed above.

Grafted Silanes

In the general formula $RR'_nSiY_{3-n}$, wherein n is 0, 1 or 2, for the silane used in the present invention, R is a non-hydrolyzable organic group which is capable of grafting onto the polymer, R' is a non-hydrolyzable organic group incapable of grafting onto the polymer and Y is a hydrolyzable organic group. Examples of the R group are vinyl, allyl, butenyl, cyclohexenyl, cyclopentadienyl, methacryloyloxypropyl, etc. Vinyl is the most preferred. Examples of the Y group include alkoxy groups such as methoxy, ethoxy, butoxy; acyloxy groups such as formloxy, acetoxy, propionoxy; oxime groups such as $—ON=C(CH_3)_2$, $—ON=C(C_6H_5)_2$; alkylamino and arylamino groups. Preferred silane compounds of the above described general formula include vinyltrimethoxysilane (VTMS) and vinyltriethoxysilane (VTES).

The amount of silane compound to be added to the copolymer component depends on the desired degree of reactivity. From about 0.1 wt % to about 20 wt % of silane is used. Preferably, from about 0.5 wt % to about 10 wt % of silane is used.

The silane-functionalized polymer component is prepared using a free radical generator which consists of an organic peroxide which can generate free radicals in a typical hydrogenated styrene-butadiene-styrene copolymer at a reaction temperature resulting in a half-life of $\leq 6$ minutes and preferably less than 1 minute at the reaction temperature. Typical examples of organic peroxides are dialkyl peroxides such as dicumyl peroxide and 1,3-bis(tert-butylperoxyisopropyl)benzene. Other peroxides such as diacyl peroxides, alkyl peresters and percarbonates may be suitable for initiating graft sites on the polymer.

The amount of free radical generator to be added to facilitate the functionalization of the polymer component depends on the properties (copolymer composition and melt index) of the hydrogenated styrene-butadiene-styrene copolymer used and the desired degree of crosslinking as well as on the type of free radical generator. From about 0.01 wt % to about 3 wt % of free radical generator is added. Preferably from about 0.05 wt % to about 1.5% of free radical generator is used.

Metalated Silanes

In general, any electrophile having the ability to react with the metalated base polymer can be grafted to the base polymer. For the present invention, the graftable compounds are silicon containing compounds that have at least one functional group that is capable of reacting with the metalated base polymer, preferably a halogen group or an alkoxy group, most preferably chloro, methoxy, or ethoxy groups. The graftable silicon compounds preferably also have at least one additional functional group that is capable of curing the modified block copolymer by condensation reactions. The preferred additional functional groups are alkoxy, acetoxy, and oximido groups, most preferably methoxy, ethoxy, and acetoxy groups. Other non-reactive groups may be present between the silicon atom and the functional groups described above, e.g. methylene or phenylene.

The preferred silicon compounds which will form graft polymers within the scope of the present invention include the following: siloxanes, halosilanes, halosiloxanes, acetoxy siloxanes, acetoxy halosilanes, oximido siloxanes, and oximido halosilanes. Examples of some preferred commercially available silicon compounds include:

2-acetoxyethyldimethylchlorosilane,
3-acetoxypropyldimethylchlorosilane,
chloromethyldimethylethoxysilane,
dimethylmethoxychlorosilane,
chloromethylenemethyldiethoxysilane,
3-chloropropylmethyldimethoxysilane,
chlorotriethoxysilane,
dimethyldiethoxysilane,
tetraethoxysilane,
3-chloropropyltrimethoxysilane, and
chlorophenyltriethoxysilane.

The preferred silicon compounds are readily curable by condensation reactions and specifically include chlorotriethoxysilane, dimethyldiethoxysilane, and tetraethoxysilane.

The quantity of molecular units having silicon containing functional groups in the modified block copolymer is dependent on the content and the aromatic structure of the alkenyl arene therein. Once these parameters are fixed, the number of such groups present is dependent on the degree of functionality desired between a minimum and maximum degree of functionality based on these parameters. This minimum and maximum functionality level corresponds to about an average of one silicon containing functional group per polymer molecule and about an average of one silicon containing functional group per cyclic ring of the A block, respectively. It is currently believed that the average of one addition per cyclic ring is limiting.

The acid functionalized block copolymers of the present invention are hydrogenated and unhydrogenated block copolymers as described above which have been reacted with various acid functional group-containing molecules. The acid functional group containing molecules which may be reacted with such block copolymers to produce a functionalized block copolymer useful in the present invention include acid or anhydride groups reacted onto the vinyl aromatic hydrocarbon block are described in U.S. Pat. No. 4,868,245 which is herein incorporated by reference. The preferred acid monomers for functionalizing the polymers of the present invention are those which can be grafted onto the diene block of the polymer in free radical initiated reactions. Such preferred monomers include acids or anhydrides or derivatives thereof such as carboxylic acid groups and their salts, anhydrides, esters, imide groups, amide groups, acid chlorides and the like. Such monomers and functionalized polymers incorporating them are described in U.S. Pat. No. 4,578,429 which is herein incorporated by reference. The preferred modifying monomers are unsaturated mono- and polycarboxylic-containing acids and anhydrides and other derivatives thereof. Examples of such monomers include maleic acid, maleic anhydride, fumaric acid and the other materials mentioned in the above-referenced patent. Sulfonic acid functionalized polymers, such as described in U.S. Pat. No. 4,086,171 above, may also be used.

The functionalized block copolymers can be subsequently reacted with other modifying materials to produce new functionalized polymers which work in the present invention. For example, the reaction products of an anhydride functionalized polymer with ammonia or a diallyl amino propyl amine are ina imide and tertiary amine functionalized polymer respectively.

The functionalized block copolymers utilized should contain from at least about 0.2% of the functional groups because this ensures the desired improvement is obtained. Preferably, from about 0.5% to about 3% of the functional groups should be present in the polymer.

Unfunctionalized block copolymers have been used in similar applications before. The products of the present invention which utilize functionalized block copolymers are much better than such prior products because products which utilize the functionalized block copolymers exhibit better adhesion to polar materials. Also, these functionalized block copolymers are more compatible with some bitumens which contain more polar components. Another advantage is that once it is adhered to a substrate the bitminous composition containing such functionalized block copolymers does not exude oil and debond from the substrate as do most of the asphalt polymer systems which are formulated to be soft and tacky.

Asphalt and asphalt polymer compositions are used as sealants to seal cracks or joints in existing structures. An example is a crack sealant used to seal cracks in an existing hot mix asphalt concrete pavement. Another example is a joint sealant used to seal portland cement concrete roads. Included within the scope of the present invention are sealant compositions which exhibit improved adhesion to such substrates.

The joint sealant composition of the present invention comprises a bituminous component and from about 1% to about 15% by weight of a functionalized polymer, either the silane or acid functionalized polymer described above. Silane functionalized block copolymers are preferred. The composition may optionally include other ingredients such as fillers, such as ground tires or inorganic fillers. The composition may also include resins and oils and other common components such as stabilizers. It may also include other polymers, for example non-functionalized polymers of conjugated diolefins. It is preferred that the bituminuous component be a compatible asplalt. Compatible asphalts are those which show little or no tendency for a low-polymer-content-containing phase to separate from the asphalt-polymer mixture and are usually soft and low in asphaltene content.

If less than about 1% of the functionalized polymer is used then there is limited flexibilization and the composition does not exhibit improved adhesion to polar substrates. If more than about 15% of the functionalized polymer is used, then the composition is too costly and high in viscosity.

Hot melt asphalt concrete compositions according to the present invention will normally contain from about 80 parts to about 99 parts by weight of aggregate and from about 1 part to about 20 parts of a bituminous composition which is generally comprised of about 85 to about 99.99 parts by weight of a bituminous component and from about 0.01 parts to about 15 parts by weight of one of the functionalized polymers discussed above. If less than about 0.01 parts of the functionalized polymer is used, then improved resistance to stripping between bitumen and aggregate is not obtained and if more than 15 parts of the functionalized polymer is used then the composition is too costly and high in viscosity. The silane functionalized polymer is preferred and silane functionalized block copolymers are most preferred. Compatible asphalts as discussed above are preferred at high polymer concentrations because there is less tendency for relatively brittle unmodified asphalt to exude from the polymer-containing phase and less compatible asphalts are preferred at very low concentrations because at very low polymer concentration the polymer does not contribute strongly to other properties such as deformation resistance, i.e. rutting resistance. At low polymer concentrations asphalts with good rutting resistance on their own are preferred. The bituminous composition may optionally include other ingredients such as fillers, such as ground tires or inorganic fillers. The composition may also include resins and oils and stabilizers. It may also include other polymers, for example non-functionalized polymers of conjugated diolefins.

Aggregate is basically rocks and sand. It is intended to be mixed with the bituminous composition to form the hot mix asphalt concrete. The bituminous composition is the binder which holds the aggregate together.

In using the bituminous composition of the present invention in hot melt asphalt concrete, it is preferred that the functionalized polymer comprise from about 0.05 to about 9 parts by weight of the bituminous composition. However, if it is desired to achieve the maximum anti-stripping results in the most cost effective manner, it is most preferred that the functionalized polymer comprise from about 0.05 to about 1 part of the bituminous composition. In order to achieve maximum results, a silanol condensation catalyst as described in U.S. Pat. No. 4,783,504, which is herein incorporated by reference, should be included in the bituminous composition in an amount from about 0.001 to about 5 parts by weight per 100 parts of polymer. Examples of suitable silanol condensation catalysts are described in the patent and include dibutyl tin dilaurate. This will increase the anti-stripping ability of the HMAC because it will allow the functionalized polymer to react with the aggregate surface more easily because it will promote chemical bonding between the polymer and the aggregate. Less catalyst and more catalyst will work but the range discussed above is generally preferred.

The use of the functionalized polymers described above is generally advantageous in bituminous compositions. As specifically described above, such advantageous uses include joint sealants and hot melt asphalt concrete. However, the functionalized polymers are also used to advantage in roofing products such as roll roofing, peel and stick roofing products and others, as well as in coatings and in water proofing layers.

EXAMPLES

Several polymers were compared: KD-1101, KG-1652, RP-6501 and KFG-1901X. KG-1652 is a commercially available selectively hydrogenated styrene-butadiene-styrene block copolymer. RP-6501 has a structure similar to KG-1652 but contains approximately 1.8% weight grafted vinyl triethoxy silane. KFG-1901X has a structure similar to KG-1652 but contains approximately 1.8% weight grafted maleic anhydride. KD-1101 is a commercially available unhydrogenated linear S-B-S block copolymer.

EXAMPLE 1

Joint Sealant Testing

Blends of three of the polymers with Martinez AR-1000 asphalt were prepared by heating the asphalt to 230° C. and then mixing the polymers with the asphalt for 45 minutes using a laboratory Silverson high shear mixer set at 3000 rpm. For the blend catalyzed with dibutyl tin dilaurate (DBTDL), which is a silanol condensation catalyst, the polymer modified asphalt was first cooled to 180° C., the catalyst was added and blending was carried out for an additional ten minutes.

The joint sealant samples were prepared by pouring the blends at 180° C. between two 1"×2"×3" blocks of the substrate such that two 1"×3" faces were joined by a 0.4" layer of sealant. The samples were allowed to cool to room temperature and then pulled on an Instron tensile tester at a separation rate of 2"/minute.

In one case, a joint sealant sample was first "annealed" for four hours at 160° C. before testing. The results obtained are given in the following table. All samples failed adhesively.

TABLE 1

| Modifier | % Elongation to Break Sealant | |
|---|---|---|
| | Portland Cement | Concrete |
| 12% KG-1652 | 125 | 225 |
| 12% RP-6501 | 325 | 375 |
| 12% RP-6501/0.12% DBTDL Annealed 4 hrs 160° C. | 575 | 600 |
| 12% KFG-1901X | 600 | 900 |

Higher elongations were obtained with the silane and maleic anhydride functionalized polymers. This illustrates improved adhesion between sealant and substrate. The higher elongations allow a greater extent of deformation before cracking or loss of adhesion occurs.

EXAMPLE 2

Hot Mix Asphalt Concrete Stripping Testing

Hot mix asphalt concrete stripping occurs when there is a loss of adhesion and a detachment between asphaltic binder and aggregate caused by the action of water. At present, hydrated lime and polyamines or polyamidoamines are used as anti-stripping additives. In the present work, KFG-1901X was screened in this application. It was postulated that a functional group containing polymer could react or interact with an aggregate surface. In addition, although resulting "bonds" could be hydrolyzable it was postulated that it would be difficult to displace a slowly diffusing polymeric species from a surface once bound by a specific interaction or reaction. KFG-1901X was chosen for preliminary screening because it is saturated and thus storage stable, it is commercially available and it contains reactive anhydride/acid functionality. RP-6501 which contains reactive silane functionality was chosen for the same reasons.

Blends were prepared in the same manner as those prepared for joint sealant testing in Example 1 except a Deer Park AC-5 asphalt was used. They were then tested for stripping on Eagle Lake river gravel aggregate using a simple laboratory boiling test. 100 gm of the gravel was soaked in deionized water for 24 hours. The aggregate was drained, dried with paper towels and then placed in a 160° C. air circulating oven for one hour. Next, the aggregate was removed from the oven. 8 grams of the blend still at 160° C. from the blending operation was stirred onto the aggregate. Stirring the mix with a spatula for two minutes ensured uniform coating of the aggregate. In some cases, the coated aggregate was then annealed for four hours at 160° C. in an air circulating oven. The coated aggregate was then poured onto release paper and allowed to cool to room temperature. The coated aggregate was then placed in 400 ml of boiling deionized water for 10 minutes. The mix was removed from the water and allowed to cool. The amount of asphalt stripped from the mix was visually estimated for each piece of aggregate.

The aggregate pieces were divided into a discrete distribution with asphalt losses of:

none, <25%, 25–50%, 50–75%, 75–100%

An averaged stripping index was calculated:

$$\text{stripping index} = \frac{[(\# <25\%)(1) + (\#25-50\%)(2) + (\#50-75\%)(3) + (\#75-100\%)(4)]}{\text{Total \# of pieces of aggregate}}$$

A stripping index of zero means no asphalt was stripped while an index of four means almost all of the asphalt was stripped. Lower stripping indices are better.

TABLE 2

| Modifier | Stripping Index |
|---|---|
| 4% KG-1652 | 1.5 |
| 4% KFG-1901X | 0.3 |
| 0.05% KFG-1901X | 0.5 |
| 0.5% RP-6501 | 1.6 |
| 0.5% RP-6501, Annealed | 1.6 |
| 0.5% RP-6501/0.005% DBTDL, Annealed | 0.9 |
| 4% RP-6501/0.04% DBTDL, Annealed | 0.4 |
| 10% RP-6501/0.1% DBTDL, Annealed | 0.6 |

Less stripping is obtained with the silane and maleic anhydride functionalized polymers. The silane functionalized polymer works well if catalyst is present and the system is annealed. However, the stripping index of the non-annealed silane functionalized polymer compares favorably with that of the polymer without functionality.

EXAMPLE 3

Acid Functionalized Polymer

KFG-1901X was mixed with asphalt with high shear mixing. The molten binder was coated onto hot aggregate and the mixture was stirred and cooled. The coated aggregate was evaluated for stripping by placing it in boiling water for ten minutes and then removing it. Each aggregate piece was calculated as described above.

Table 3 gives results for Eagle Lake river gravel in which binders with no modifier, binders with conventional block polymer modifiers and binders with KFG-1901X are compared. Within experimental error block copolymers without reactive functional groups do not act as anti-stripping additives. KFG-1901X does. Also, KFG-1901X works at extremely low use levels.

Two anti-stripping additives used commercially, hydrated lime and a liquid additive believed to be a polyamine in tall oil, were compared to KFG-1901X. The liquid additive, Akzo Chemical's Redicote 82-S, was chosen because it is advertised as heat stable and thus possibly similar to KFG-1901X in that regard. The liquid additive was added directly to the hot asphalt with low shear mixing following the recommendations of the manufacturer. Redicote 82-S is added typically at approximately 0.5% wt. basis asphalt. The lime was added in the form of a 35% wt. solids water slurry directly to the aggregate and this mixture was then heated to remove water. The hot asphalt was then added to the lime coated aggregate. We also screened dry lime addition to asphalt and to aggregate. The water slurry method gave the best results.

A summary of the results on all five aggregates examined is given in Table 4. The results of Table 4 show that KFG-1901X exhibits anti-stripping activity on all aggregates examined. KFG-1901X outperforms the other two additives on the limestone and river gravel and is possibly the additive of choice on the mountain gravel. KFG-1901X also outperforms the liquid anti-stripping additive Redicote 82-S on the granite. It is of interest to note that KFG-1901X improves with increasing use level.

KFG-1901X has other advantages over the competitive materials. For example, lime requires elaborate equipment at the mix plant since it is most effective when added with the slurry method. Liquid anti-strips also require facilities at the mix plant where they are added directly to the asphalt. Liquid anti-strips are also extremely corrosive and cause handling difficulties. KFG-1901X, on the other hand, could be added to the asphalt by the asphalt supplier.

TABLE 3

| Eagle Lake Gravel/Deer Park AC-5 Asphalt | |
| --- | --- |
| Modifier | Stripping Index[1] |
| None | 2.6, 1.4 |
| 4% KD-1101 | 1.6, 1.4 |
| 4% KG-1652 | 1.8, 1.9 |
| 4% KFG-1901X | 0.3, 0.1 |
| 1% KFG-1901X | 0.2 |
| 0.25% KFG-1901X | 0.4 |
| 0.05% KFG-1901X | 0.5 |

[1]When more than one value is shown the second value is a repeat measurement.

TABLE 4

| | Comparison of KFG-1901X to Commercial Anti-stripping Additives - Stripping Indices | | | | |
| --- | --- | --- | --- | --- | --- |
| Stripping Index | High Absorption Limestone | Eagle Lake River Gravel | Mountain Gravel Conglomerate | Lithonia Granite | Gulf Coast Gravel |
| Neat Deer Park AC-5 | 1.9 | 2.6, 1.4[5] | 1.8 | 3.3 | 1.9 |
| 0.5% w KFG-1901X | 0.4 | 0.4 | 0.7 | 0.9 | 0.7 |
| Redicote 82-S[1] | 1.0 | — | 1.2 | 1.4 | 0.8 |
| Hydrated Lime[2] | 0.6 | 0.4 | 0.8 | 0.5 | 0.4 |
| 0.25% w KFG-1901X | 0.8 | 0.4 | 1.3 | 1.3 | 1.1 |
| Redicote 82-S[3] | 1.3 | — | 1.1 | 1.3 | 0.5 |
| Hydrated Lime[4] | 0.9 | 0.8 | 1.0 | 0.8 | 0.3 |

[1]1.25% w Basis Asphalt
[2]1.2% w Basis Aggregate
[3]0.63% w Basis Asphalt
[4]0.6% w Basis Aggregate
[5]Repeat Measurement

We claim:

1. A bituminous composition comprising a bituminous component and a silane functionalized polymer of a conjugated diolefin wherein silane functionality is grafted onto the polymer.

2. The composition of claim 1 wherein the silane functionalized polymer is a block copolymer of a vinyl aromatic hydrocarbon and a conjugated diolefin.

3. A joint sealant composition comprising a bituminous component and from about 1% to about 15% by weight of a silane functionalized polymer of a conjugated diolefin wherein silane functionality is grafted onto the polymer.

4. The composition of claim 3 wherein the silane functionalized polymer is a block copolymer of a vinyl aromatic hydrocarbon and a conjugated diolefin.

5. A hot melt asphalt concrete composition comprising:
   (a) from about 80 parts to about 99 parts by weight of aggregate, and
   (b) from about 1 part to about 20 parts by weight of a bituminous composition which is comprised of:
      (i) from about 85 parts to about 99.99 parts by weight of a bituminous component, and
      (ii) from about 0.01 parts to about 15 parts by weight of a silane functionalized polymer of a conjugated diolefin wherein silane functionality is grafted onto the polymer.

6. The composition of claim 5 wherein the silane functionalized polymer is a block copolymer of a vinyl aromatic hydrocarbon and a conjugated diolefin.

7. The hot melt asphalt concrete composition of claim 5 wherein the silane functionalized polymer comprises from about 0.05 parts to about 9 parts of the bituminous composition.

8. The hot melt asphalt concrete composition of claim 5 wherein the silane functionalized polymer comprises from about 0.05 parts to about 1 part of the bituminous composition.

9. A hot melt asphalt concrete composition comprising:
   (a) from about 80 parts to about 99 parts by weight of aggregate, and
   (b) from about 1 part to about 20 parts by weight of a bituminous composition which is comprised of:
      (i) from about 85 parts to about 99.99 parts by weight of a bituminous component, and
      (ii) from about 0.01 parts to about 15 parts by weight of a silane functionalized polymer of a conjugated diolefin, and
      (iii) from about 0.01 parts to about 0.001 parts to about 5 parts by weight per 100 parts of polymer of a silanol condensation catalyst.

10. The composition of claim 9 wherein the silane functionalized polymer is a block copolymer of a vinyl aromatic hydrocarbon and a conjugated diolefin.

11. The hot melt asphalt concrete composition of claim 9 wherein the silane functionalized polymer comprises from about 0.05 parts to about 9 parts of the bituminous composition.

12. The hot melt asphalt concrete composition of claim 11 wherein the silane functionalized polymer comprises from about 0.05 parts to about 1 part of the bituminous composition.

* * * * *